(12) United States Patent
Martin

(10) Patent No.: US 12,314,021 B2
(45) Date of Patent: May 27, 2025

(54) SYSTEM AND METHOD FOR PROVIDING POWER TO BUILDING MANAGEMENT SYSTEM COMPONENTS USING INDUCTIVE COUPLING

(71) Applicant: Sensormatic Electronics, LLC, Boca Raton, FL (US)

(72) Inventor: Walter A. Martin, Ballymena (GB)

(73) Assignee: Sensormatic Electronics, LLC, Boca Raton, FL (US)

( * ) Notice: Subject to any disclaimer, the term of this patent is extended or adjusted under 35 U.S.C. 154(b) by 227 days.

(21) Appl. No.: 16/376,499

(22) Filed: Apr. 5, 2019

(65) Prior Publication Data

US 2019/0310595 A1    Oct. 10, 2019

Related U.S. Application Data

(60) Provisional application No. 62/654,763, filed on Apr. 9, 2018.

(51) Int. Cl.
*G05B 19/04* (2006.01)
*G05B 15/02* (2006.01)

(52) U.S. Cl.
CPC ........... *G05B 19/041* (2013.01); *G05B 15/02* (2013.01); *G05B 2219/2642* (2013.01)

(58) Field of Classification Search
None
See application file for complete search history.

(56) References Cited

U.S. PATENT DOCUMENTS

2007/0233323 A1* 10/2007 Wiemeyer ........... H04L 43/0817
                                                  700/276
2011/0226506 A1*  9/2011 Hamilton ............. H05K 5/0017
                                                  174/59

(Continued)

FOREIGN PATENT DOCUMENTS

DE   102012108970 A1 *  4/2014 ........... G06Q 10/087
KR     20150081804 A  *  7/2015

(Continued)

OTHER PUBLICATIONS

Rockwell, "AADvance Controller System Build Manual", Jul. 2012, Rockwell Automation, pp. 1-2, 1-15 (Year: 2012).*

(Continued)

*Primary Examiner* — David Earl Ogg
(74) *Attorney, Agent, or Firm* — ArentFox Schiff LLP

(57) ABSTRACT

Mains-powered components of a building management system can be separated from non-mains powered components, allowing for easier and more affordable installation of the latter. In one embodiment, distributed devices of the building management system include a base module and a secondary module. The base module inductively powers the secondary module, which performs a function of the building management system (e.g. generating sensor data). The secondary module is easily attached to and removed from the base module via an attachment mechanism (e.g. snapfit) without rewiring the device. In another embodiment, a control panel inductively powers one or more input-output blocks, which provide an interface between distributed devices and the control panel. The input-output blocks are easily attached to and removed from the control panel via the attachment mechanism.

19 Claims, 8 Drawing Sheets

(56) References Cited

U.S. PATENT DOCUMENTS

| | | | | |
|---|---|---|---|---|
| 2012/0112531 A1* | 5/2012 | Kesler | ................... | H02J 50/12 |
| | | | | 307/9.1 |
| 2012/0152381 A1* | 6/2012 | Ungerer | ............... | G05B 19/042 |
| | | | | 137/552 |
| 2016/0268843 A1* | 9/2016 | Baarman | ............ | G06Q 30/0255 |
| 2017/0108236 A1* | 4/2017 | Guan | ................... | H05B 47/19 |
| 2018/0158316 A1* | 6/2018 | Ham | ...................... | G08C 17/02 |

FOREIGN PATENT DOCUMENTS

| | | | | |
|---|---|---|---|---|
| WO | WO 2016086017 | | 6/2016 | |
| WO | WO-2016086017 A1 * | | 6/2016 | ............. G02F 1/153 |

OTHER PUBLICATIONS

Stack Exchange, "Why is mains power sometimes 110V and other times 120V?", Feb. 2013, https://electronics.stackexchange.com/questions/57739/, pp. 1-2 (Year: 2013).*

Partial Search Report, mailed on Oct. 1, 2019, from European Application No. 19167959.6, filed on Apr. 8, 2019. 8 pages.

* cited by examiner

SYSTEM AND METHOD FOR PROVIDING POWER TO BUILDING MANAGEMENT SYSTEM COMPONENTS USING INDUCTIVE COUPLING

RELATED APPLICATIONS

This application claims the benefit under 35 USC 119(e) of U.S. Provisional Application No. 62/654,763, filed on Apr. 9, 2018, which is incorporated herein by reference in its entirety.

BACKGROUND OF THE INVENTION

Building management systems such as building automation systems, fire alarm systems, security systems and access control systems are often installed within a premises such as commercial, residential, or governmental buildings. Examples of these buildings include offices, hospitals, warehouses, public infrastructure buildings including subways and bus terminals, multi-unit dwellings, schools or universities, shopping malls, government offices, and casinos.

In general, building management systems include one or more control panels or controllers connected to distributed devices positioned throughout the building. The distributed devices generally include combinations of sensors, user interfaces, and actuators. The sensors detect conditions throughout the premises and send data or analog signals to the control panels indicating the conditions. User interfaces display information and receive input from users of the systems. Actuators perform physical operations to control the environment of the premises.

Building automation systems will typically include one or more building automation control panels and distributed devices that control and monitor the physical plant aspects of a building and aspects of business-specific electrical, computer, and mechanical systems. The physical plant typically includes heating, ventilation, and air conditioning (HVAC) systems, elevators/escalators, lighting and power systems, refrigeration and coolant systems, and air and/or water purification systems, in examples. HVAC systems typically include air handlers and systems of ducts and vents for circulating air throughout the building. Business-specific systems include computer systems, manufacturing systems that include various types of computer-aided machinery and test equipment, and inventory control and tracking systems, in examples. Sensors for building automation systems include, for example, temperature sensors, light sensors, humidity sensors, volatile organic compound (VOC) sensors. User interface elements for building automation systems might include touchscreen displays (for example, as part of a thermostat or other indicator). Actuators for building automation systems include dampers, chillers, smart lighting systems, motorized shades, and other mechanical equipment, to list a few examples.

Security systems typically include intrusion control panels and their own distributed devices. The distributed devices detect indications of intrusions, building security breaches and unauthorized access at or within the building and report to the intrusion panels. Security distributed devices include sensors such as motion sensors, door and window relays, thermal sensors, and surveillance cameras that communicate with the intrusion panel over a security network. Motion sensor devices can detect intrusions and unauthorized access to the premises, and send indications of the intrusions to the security panel. The surveillance camera devices capture video data of monitored areas within the premises, in examples.

Fire alarm systems typically include fire control panels that function as system controllers. Distributed devices for fire alarm systems include fire detection/initiation sensors such as smoke detectors, carbon monoxide detectors, flame detectors, temperature sensors, and/or pull stations (also known as manual call points), fire notification user interface elements such as speakers, horns, bells, chimes, light emitting diode (LED) reader boards, and/or flashing lights (e.g., strobes), and actuators such as fire suppression systems. The fire detection devices monitor the buildings for indicators of fire. Upon detection of an indicator of fire such as smoke or heat or flames, the distributed device is activated and a signal is sent from the activated distributed device to the fire control panel. The fire control panel then initiates an alarm condition by activating audio and visible alarms of the fire notification devices of the fire alarm system and activating fire suppression systems, which are also distributed around the building. Additionally, the fire control panel will also send an alarm signal to a monitoring station, which will notify the local fire department or fire brigade.

Access control systems typically include control panels such as system controllers and door controllers, and distributed devices, including door position sensors, access control readers, and actuators like electric door locks, to list a few examples. The access control readers are often installed at access points of the buildings to control access to restricted areas, such as buildings or areas of the buildings. Examples of access points include front and interior doors of a building, elevators, hallways connecting two areas of a building. The access control readers read the information of keycards and/or transmitted from mobile computing devices and then the access control systems determine if the individuals are authorized to access the restricted areas. If the individuals are authorized to enter the restricted areas, then the access control readers allow access to the restricted areas by unlocking locked doors, signaling that doors should be unlocked, and activating elevators. Alarms can be generated upon unauthorized entry.

Generally, control panels and distributed devices of building management systems communicate over a wired and/or wireless network using various communications protocols. However, some distributed devices do not connect directly to the network and instead connect to input-output blocks, which provide an interface for these devices to communicate with, for example, the control panels on the network. These input-output blocks can be part of the control panels or standalone relay devices.

SUMMARY OF THE INVENTION

Many control panels and distributed devices of building management systems are mains (110V/240V) powered, requiring qualified electricians to perform installation, maintenance and repair work involving these devices, including installing the devices themselves and also installing control panels that interface with these devices. Additionally, distributed devices that are mains powered also have regulatory implications that complicate their production and installation. This results in higher labor costs for installing and maintaining components of building management systems. At the same time, building management system technology evolves at a rapid pace, making adoption of the new technology prohibitively expensive because of the costs associated with retrofitting.

Using inductive coupling, mains powered components can be separated from non-mains powered components of the building management system, allowing for easier and more affordable installation of the latter. In one example, a control panel inductively powers and wirelessly communicates with an input-output block that is externally attached to the control panel. This allows the low voltage technician to connect the distributed devices while an electrician only needs to install the control panel. In another example, a distributed device of the building management system is separated into a base module and a secondary module. The base module inductively powers the secondary module, which can be easily interchanged and updated without the need for an electrician.

In general, according to one aspect, the invention features a distributed device of a building management system. The device comprises a base module and a secondary module attached to the base module. The base module comprises an inductive power transmitter, and the secondary module comprises an inductive power receiver for receiving power from the inductive power transmitter of the base module and one or more sensors, user interface elements, and/or actuators of the building management system.

In embodiments, the one or more sensors, user interface elements, and/or actuators generate signals and/or sensor data to be sent to a controller, detect user input data and provide status information to users and/or technicians of the building management system and/or control equipment of the building management system. The secondary module communicates with the controller of the building management system via a wireless transceiver. The base module is compatible with different interchangeable secondary modules, which are secured to via one or more attachment mechanisms. The base module confirms compatibility with the secondary module before providing power to the secondary module.

In general, according to another aspect, the invention features a method for operation of a distributed device of a building management system. A base module provides power via an inductive power transmitter to a secondary module attached to the base module. The secondary module receives the power from the base module via an inductive power receiver, and one or more sensors, user interface elements, and/or actuators of the secondary module communicate with a controller of the building management system.

In general, according to another aspect, the invention features a building management system comprising a controller and one or more input-output blocks, which provide connectivity between the controller and distributed devices of the building management system via interfaces for communicating with the distributed devices. The controller comprises one or more inductive power transmitters from which inductive power receivers of the input-output blocks receive power.

In general, according to another aspect, the invention features a method of operation for a building management system. A controller provides power to one or more input-output blocks via one or more inductive power transmitters. The input-output blocks receive the power from the controller via inductive power receivers, and distributed devices communicate with the controller via interfaces of the one or more input-output blocks.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1A:
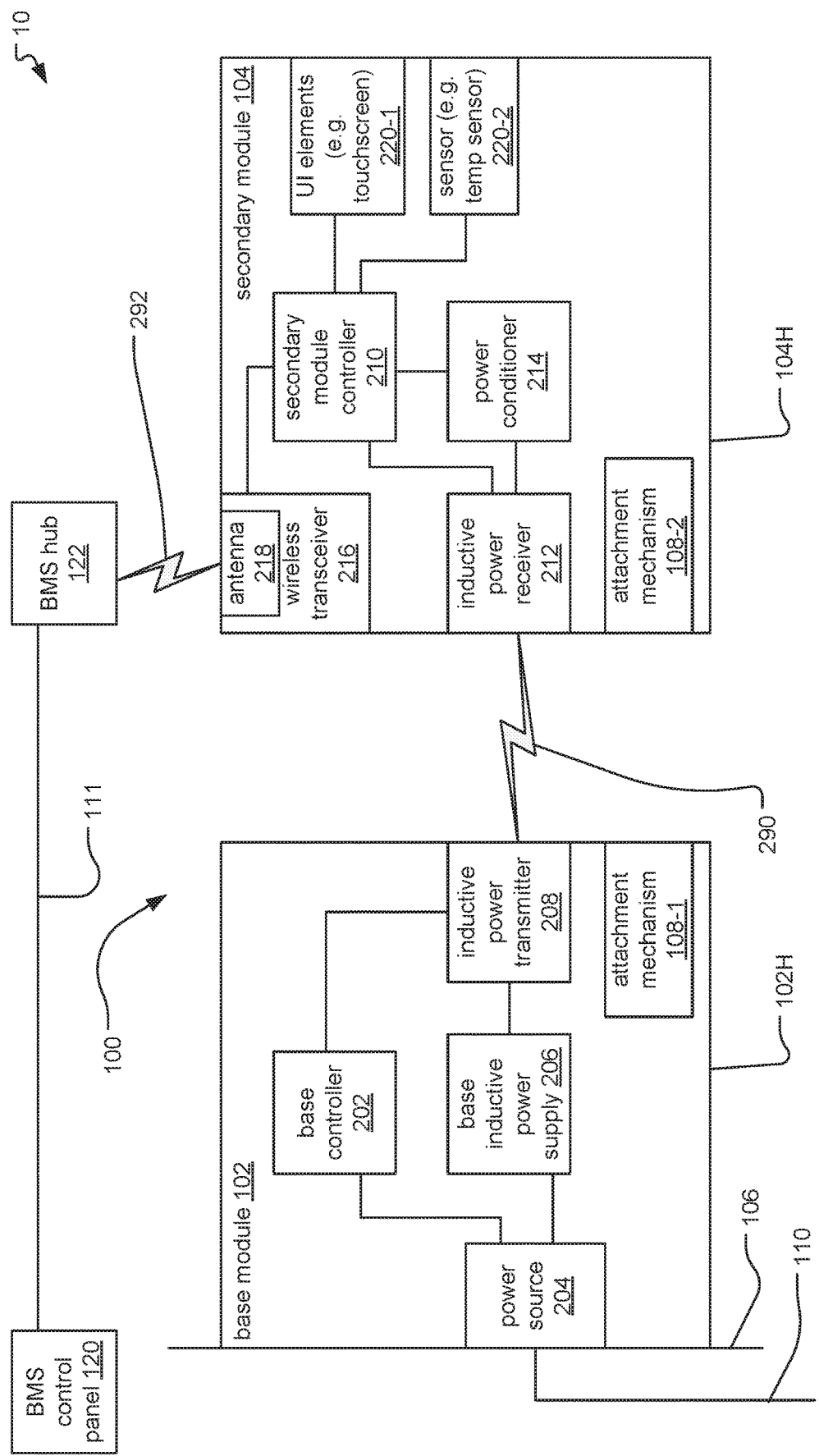
FIG. 1A is a schematic diagram of an exemplary distributed device of a building management system according to one embodiment of the present invention.

FIG. 1A is a schematic diagram of an exemplary distributed device 100 of a building management system 10 according to one embodiment of the present invention.

In general, building management systems 10 control and monitor various equipment and conditions throughout a building and can include building automation systems, fire alarm systems, security systems, and/or access control systems, among other examples. These systems are installed in buildings such as offices, hospitals, warehouses, retail establishments, shopping malls, schools, multi-unit dwellings, government buildings, or casinos.

The building management system 10 typically include control panels 120 and distributed devices 100 positioned throughout the building. The control panels 120 direct the function of the respective building management system 10 by receiving signals and/or data (for example, from distributed devices 100), sending instructions, and determining and sending status information or sensor data, among other examples, to be displayed on the distributed devices TOO.

Distributed devices 100 communicate with their respective control panels 120 via wired and/or wireless networks 111 of the building. These networks 111 support digital and/or analog communication between the distributed devices 100 and the respective control panels 120. Some distributed devices 100 connect to the network 111 via building management system hubs 122, which provide wired and/or wireless access points to support the connectivity of the distributed devices 100.

The exemplary distributed device 100 includes a base module 102 and a secondary module 104 attached to the base module 102 via one or more attachment mechanisms 108. Each of the base module 102 and the secondary module 104 have their own discrete housings 102H, 104H that are separate from each other. The housing 102H of the base module 102 protects the components of the base module. The housing 104H of the secondary module 104 protects the components of the secondary module. The attachment mechanisms 108 connects the secondary module housing 104H to the base module housing 102H so that the secondary module housing 104H is mechanically supported by the base module housing 102H, which is connected to wall of the building, for example.

In one example, the attachment mechanism provides for a snapfit mechanical connection of the housing of the secondary module to the housing of the base module. In other examples, the attachment mechanism provides for a magnetic connection of the secondary module to the base module. In this case, a permanent magnet in one or both of the modules holds them together. In other examples, the attachment mechanism provides for a bolt/screw connection in which bolts or screws secure the secondary module to the base module.

The base module includes a base controller 202, a power source 204, a base inductive power supply 206, and an inductive power transmitter 208, The secondary module 104 includes a secondary module controller 210, a power conditioner 214, a wireless transceiver 216, an antenna 218, an inductive power receiver 212 and one or more sensors 220-2, user interface elements 220-1 and/or actuators 220-3, among other examples.

In the illustrated example, the secondary module 104 has a touchscreen display type user interface 220-1 and a temperature sensor 220-2.

In general, the base module 102 is permanently mounted to a mounting surface 106 of the building such as a wall and is connected to a mains power line 110, which supplies alternating current electric power to the base module 102, typically at voltages ranging from 110 to 240 Volts. The base module 102 in turn powers the secondary module 104 inductively. The secondary module 104 receives power from the base module 102 and performs various functions of the building management system 10, via the sensors, user interface elements, and/or actuators 220, such as detecting conditions of the premises, generating sensor data and/or analog signals, receiving user input, providing status information, communicating with other devices of the building management system 10 or performing physical operations to control the environment of the building, among other examples.

In more detail, the power source 204 provides power (supplied by the mains power line 110) to the components of the base module 102 including the base controller 202 and the base inductive power supply 206. Often the power supply converts the AC mains power to a lower voltage DC that is supplied to a power bus within the base module. The base controller 202, such as a microcontroller r system on a chip (SoC) often includes one or more processor cores along with memory and programmable input/output peripherals such as analog to digital converts and digital to analog converters. The base controller 202 executes firmware instructions and, in general, sends instructions to and receives data from the base inductive power supply 206 to prevent overload and overheating conditions, for example. The base module 102 wirelessly provides power to the secondary module 104 via the base inductive power supply 206, inductive power transmitter 208, which transmits power to the inductive power receivers 212 and the power conditioning circuits 214 of the secondary module 104.

When the secondary module 104 is attached, the inductive power transmitter 208 comes into proximity with the inductive power receiver 212 of the secondary module 104. The base inductive power supply 206 supplies an alternating or direct current to the inductive power transmitter 208, which is, for example, a coil. An oscillating magnetic field is formed, which induces an alternating current in the inductive power receiver 212, as illustrated as a wireless power link 290. This alternating current is then conditioned by the power conditioner 214, for example, by converting it to direct current to power the secondary module 104.

The secondary module controller 210 receives power from the power conditioner 214. It is typically a microcontroller or system on a chip (SoC) and often includes one or more processor cores along with memory and programmable input/output peripherals such as analog to digital converters and digital to analog converters, executes firmware instructions and, in general, sends instructions to and receives data from the inductive power receiver 212 and input and/or output elements 220. The secondary module controller 210 also sends and receives data and instructions to and from the control panel 120 via the wireless transceiver 216, wireless antenna 218, and the building management system hub 122 over a wireless communications link 292.

For example, in one implementation, the secondary module 104 functions as a thermostat of a building automation system. Here, the sensor 220-2 is a temperature detector, for example. The secondary module controller 210 then monitors the temperature and sends status information (i.e., temperature readings) via the wireless transceiver 216 to the hub 122. The hub then forwards this status information onto a building automation controller serving as the BMS control panel 120.

In another example, the secondary module 104 functions as a smoke detector of a fire alarm system. Here, the sensor 220-2 is a smoke detector, for example. The secondary module controller 210 then monitors the smoke detector sensor for indications of smoke and fire and also sends status information (i.e., level of detected smoke) via the wireless transceiver 216 to the hub 122. The hub then forwards this status information onto a fire alarm panel serving as the BMS control panel 120.

In yet another example, the secondary module 104 functions as a motion detector of a security system. Here, the sensor 220-2 is a motion sensor, for example. The secondary module controller 210 then monitors the motion sensor for indications of movement in the surrounding area and also sends status information (i.e., intrusion alarm information) via the wireless transceiver 216 to the hub 122. The hub then forwards this status information onto a security panel serving as the BMS control panel 120.

In still another example, the secondary module 104 functions as an access control reader of an access control system. Here, the sensor 220-2 is a wireless receiver, for example. The secondary module 104 may also include user interface elements 220-1 such as keypads or displays. The secondary module controller 210 then monitors the wireless receiver for access control credentials and sends status information (e.g. user credentials, validation information) via the wireless transceiver 216 to the hub 122. The hub then forwards this status information onto an access control system controller serving as the BMS control panel 120.

Figure 1B:
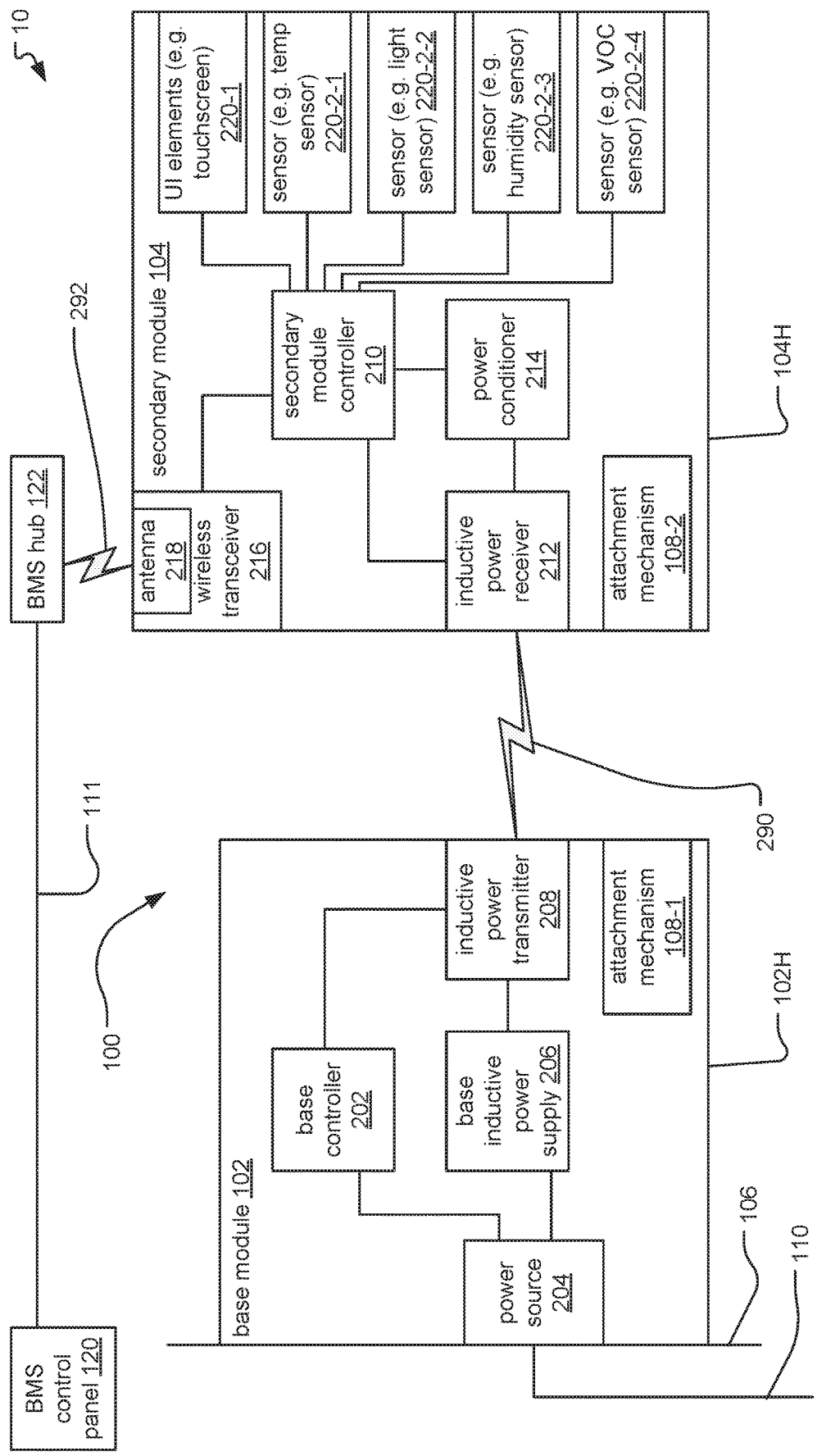
FIG. 1B is a schematic diagram of an exemplary distributed device according to another embodiment of the present invention.

FIG. 1B is a schematic diagram of another exemplary distributed device 100 of a building management system 10, showing how the secondary module 104 can include different combinations of input and/or output elements 220. Here, the secondary module 104 includes a light sensor 220-2-2 a humidity sensor 220-2-3, and a volatile organic compound (VOC) sensor 220-2-4, in addition to the temperature sensor 220-2-1 and the touchscreen display 220-1.

In an example of how these modules might be used, a secondary module 104 including only a few sensors 220-2, user interface elements 220-1 and/or actuators 220-3 such as the one depicted in FIG. 1A is replaced by a new secondary module 104 including additional sensors 220-2, user interface elements 220-1 and/or actuators 220-3 such as the one depicted in FIG. 1B. In this example, the old secondary module 104 is detached from the base module 102 and replaced with the new secondary module 104.

Figure 1C:
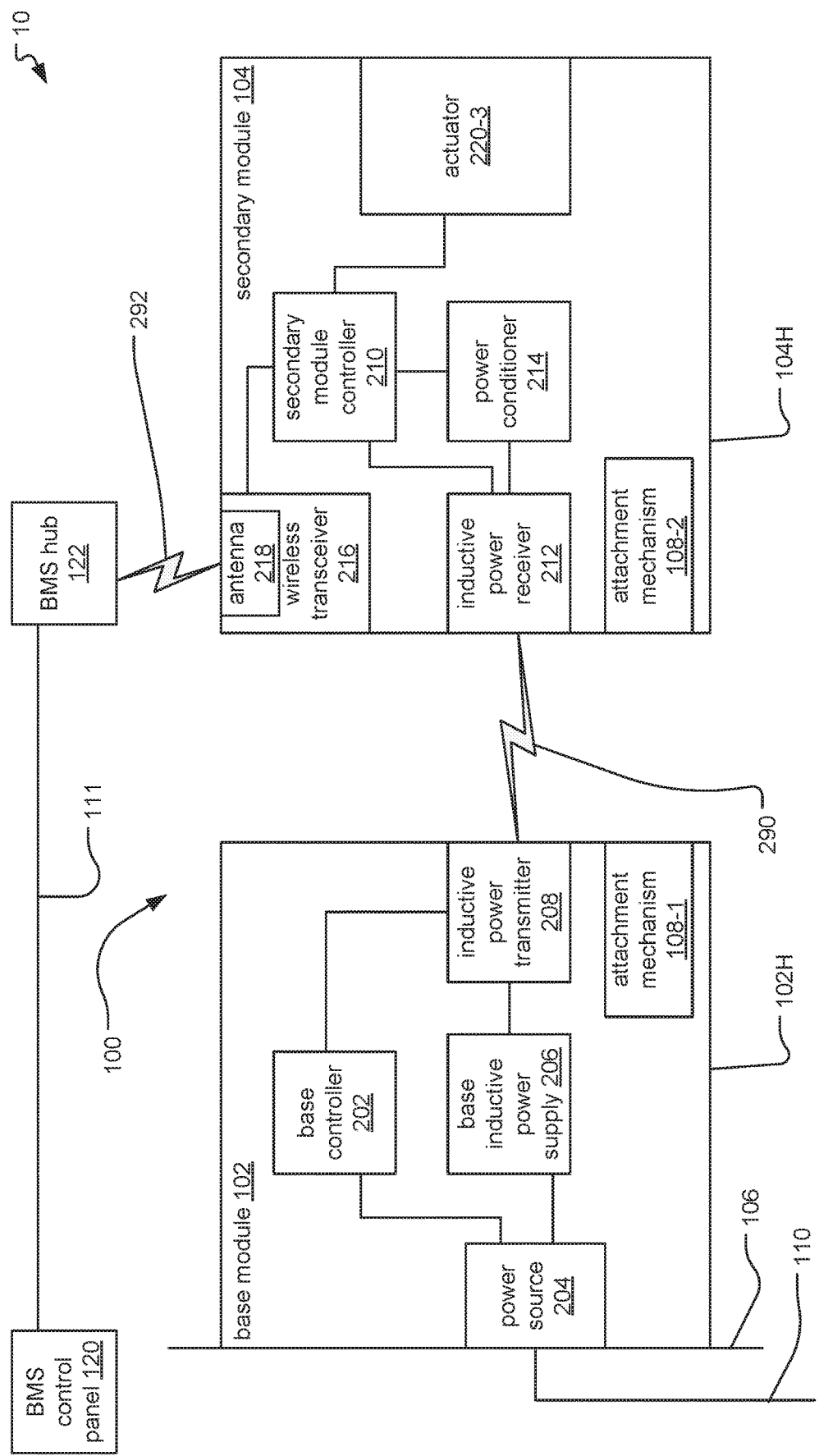
FIG. 1C is a schematic diagram of an exemplary distributed device according to another embodiment of the present invention.

FIG. 1C is a schematic diagram of another exemplary distributed device 100 of a building management system 10, showing how the secondary module 104 can include different combinations of sensors 220-2, user interface elements 220-1 and/or actuators 220-3. Here, the secondary module 104 includes an actuator 220-3. The actuator might be an automatic door lock, for example, for automatically unlocking and locking a door as part of an access control system.

Figure 1D:
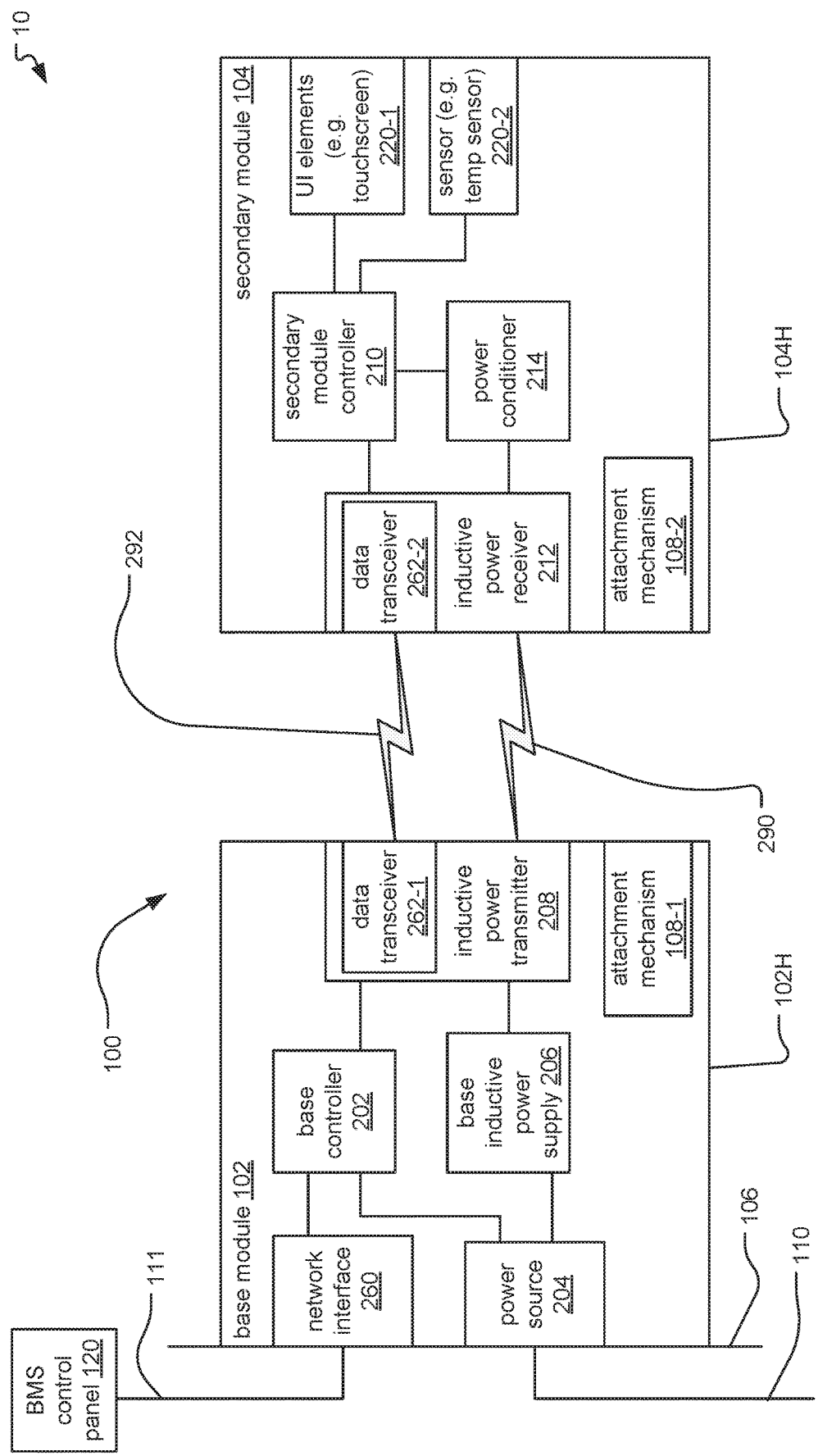
FIG. 1D is a schematic diagram of a distributed device of a building management system according to another embodiment of the present invention.

FIG. 1D is a schematic diagram of a distributed device 100 of a building management system 10, according to an alternative embodiment of the invention in which the base module 102 and the secondary module 104 communicate inductively.

Here, each of the inductive power transmitter 208 and the inductive power receiver 212 include data transceivers 262. Specifically, data transceiver 262-1 of the based module 102 causes the inductive power transmitter 208 to generate a modulated inductive power signal and a data transceiver 262-2 of the inductive power receiver 212 then demodulates this signal in order to communicate data from the base module 102 to the secondary module 104 via the wireless communications link 292. On the other hand, the data transceiver 262-2 of the secondary module causes the inductive power receiver 212 to generate a modulated inductive power signal such as by modulating how power is received and the data transceiver 262-1 of the inductive power transmitter 208 then demodulates this signal in order to communicate data from the secondary module 104 to the base module 102 via the wireless communications link 292.

Here, the base module 102 now includes a network interface 260, through which data can be sent and received to and from other devices on the network 111.

In this way, the secondary module 104 can communicate with devices on the network 111 such as the control panel 120 via inductive communication with the base module 102.

Figure 2A:
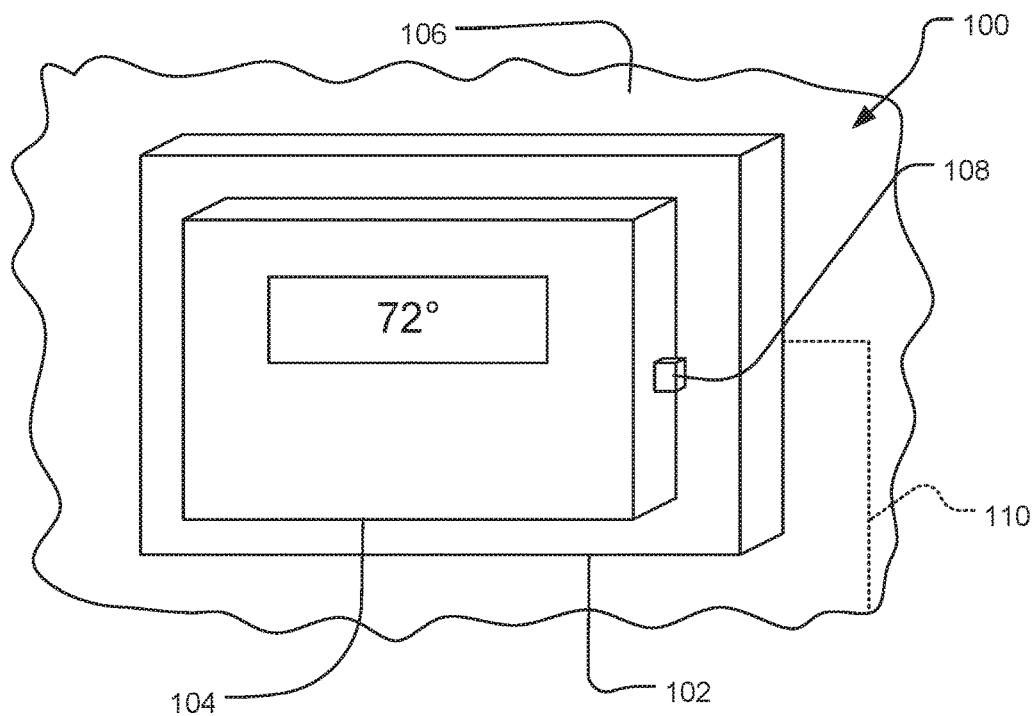
FIG. 2A is a perspective view of an exemplary distributed device.
Figure 2B:
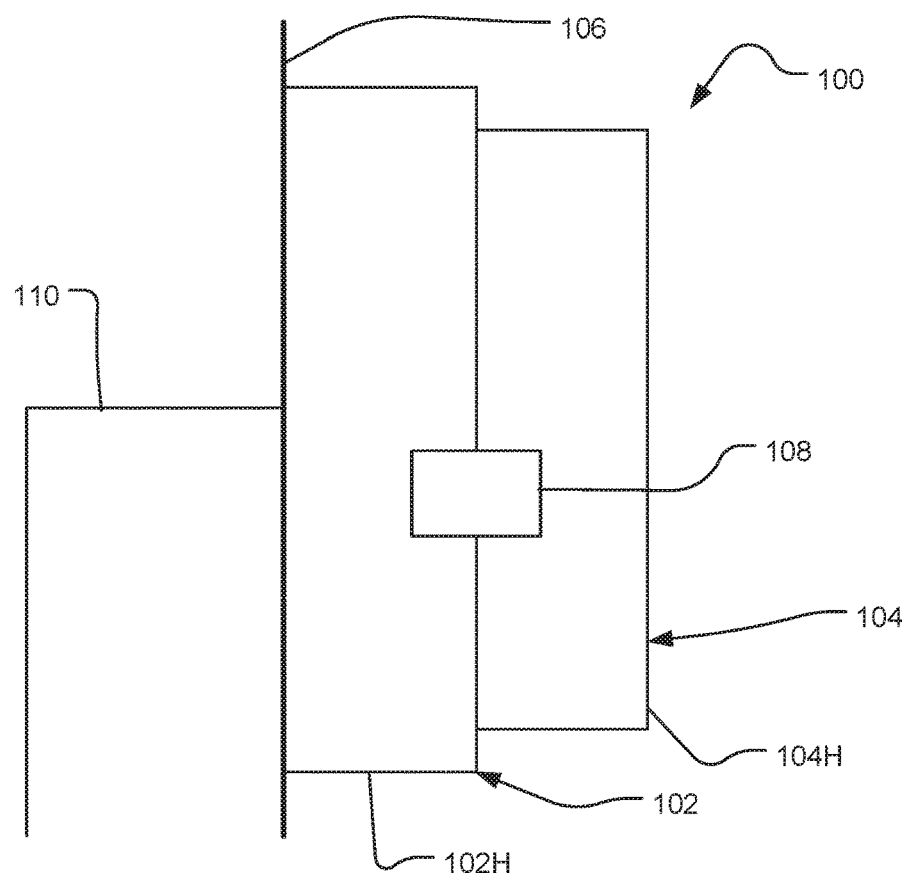
FIG. 2B is a side view of an exemplary distributed device.

FIG. 2A is a perspective view of an exemplary distributed device 100, showing how the secondary module 104 attaches to the mains-powered base module 102 on a wall. In the illustrated example, the distributed device 100 is a thermostat. FIG. 2B is a side view illustrating the same exemplary device. In both figures, the attachment mechanism 108 secures the secondary module 104 to the base module 102.

Figure 3:
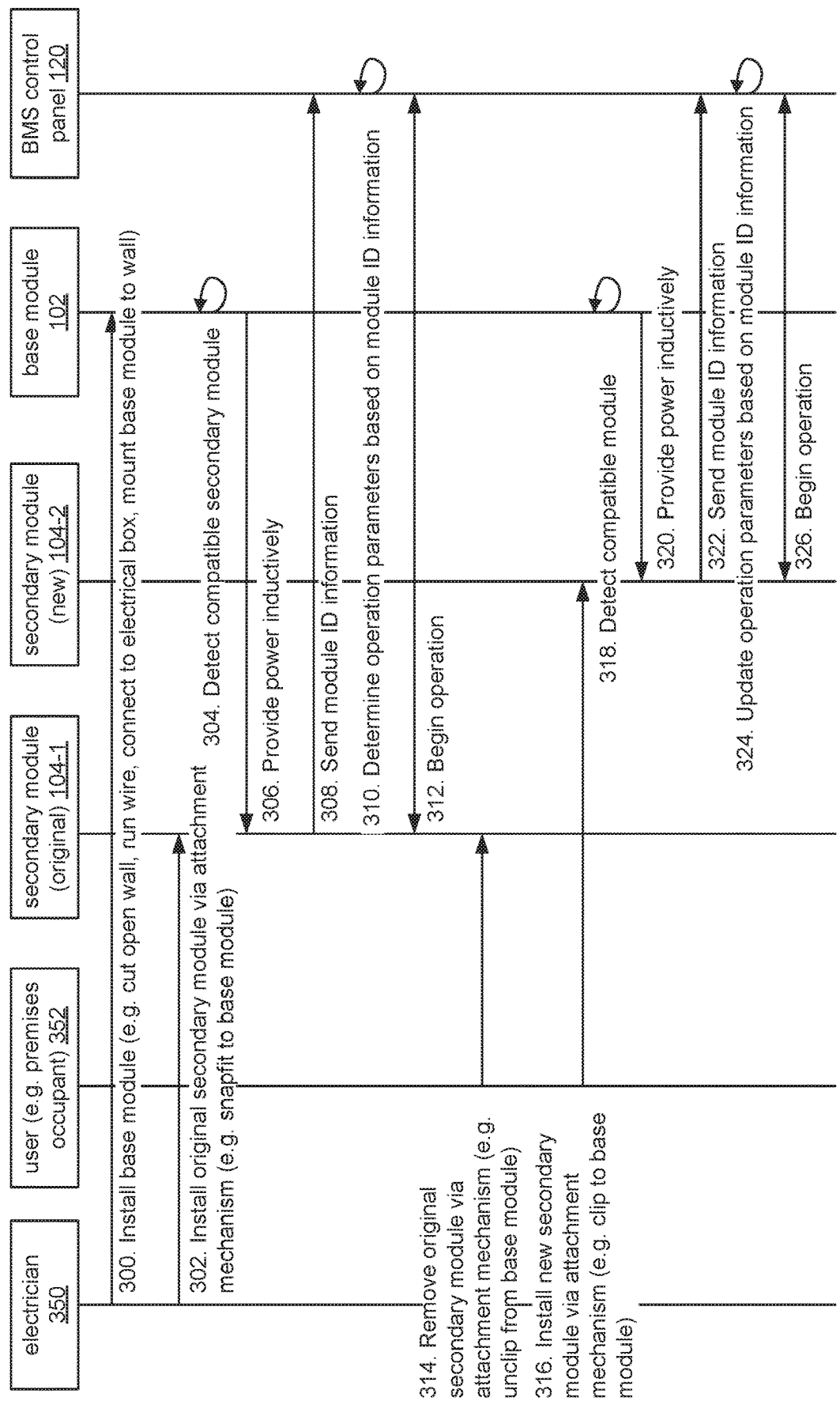
FIG. 3 is a sequence diagram illustrating how the distributed device is installed, operated and upgraded.

FIG. 3 is a sequence diagram illustrating an example of how the distributed device 100 can be installed, operated and upgraded according to the present invention.

An electrician 350 installs the distributed device by first installing the base module 102 in step 300. For example, installation of the base module 102 might involve cutting open the mounting surface (wallboard) 106, pulling a power line 110 through the opening or adding a junction box behind the opening, and physically mounting the base module 102 to the mounting surface 106 and junction box, a procedure that would likely require a specialized electrician qualified to perform work on mains powered devices. Then, in step 302, the electrician 350 installs the original secondary module 104-1 via the attachment mechanism 108.

In step 304, the base module 102 detects a compatible secondary module 104-1 and provides power to it inductively in step 306. In one example, the base module 102 does not attempt to provide power if a metal object that is not a recognized secondary module 104 is placed in proximity to the inductive power transmitter 208.

In step 308, the original secondary module 104-1 sends module identification (ID) information (e.g. a serial number or other unique identifier) to the control panel 120, which uses the module ID to determine the parameters for operating the distributed device 100. In one example, the control panel 120 determines what sensors 220-2, user interface elements 220-1 and/or actuators 220-3 are provided on the secondary module 104 (for example, which sensors are available) and determines what data should be expected and/or what instructions should be sent to the distributed device 100. Preferably, the secondary module 104 also receives identification information from the base module 102 such as a type of module and a serial number and further sends this information to the control panel 120.

In step 312, the distributed device 100 begins operation, for example, by communicating sensor data to the control panel 120.

In step 314, a user 352 of the building management system 10, as part of an upgrade process or repair operation, removes the original secondary module 104-1 from the base module 102 by disengaging the attachment mechanism 108 and replaces the secondary module 104-1 with a new secondary module 104-2 in step 316. In one example, the user 352 is a building occupant with no electrical training. In another example, the user 352 is a technician performing maintenance on the building management system 10 with only limited electrical training. Thus, in general, the secondary module 104, which is interchangeable with other secondary modules 104, can be installed, changed and/or replaced simply by a user 352 of the building management system 10 such as an occupant of the premises or a technician without advanced electrical qualifications.

In step 318, the base module 102 detects a compatible secondary module 104-2 as before. Similarly, the base module 102 then provides power inductively in step 320, and the new secondary module 104-2 sends its module ID to the control panel 120.

In step 324, the control panel 120 updates the operation parameters for the distributed device 100, and in step 326, the distributed device 100 begins operation.

Figure 4:
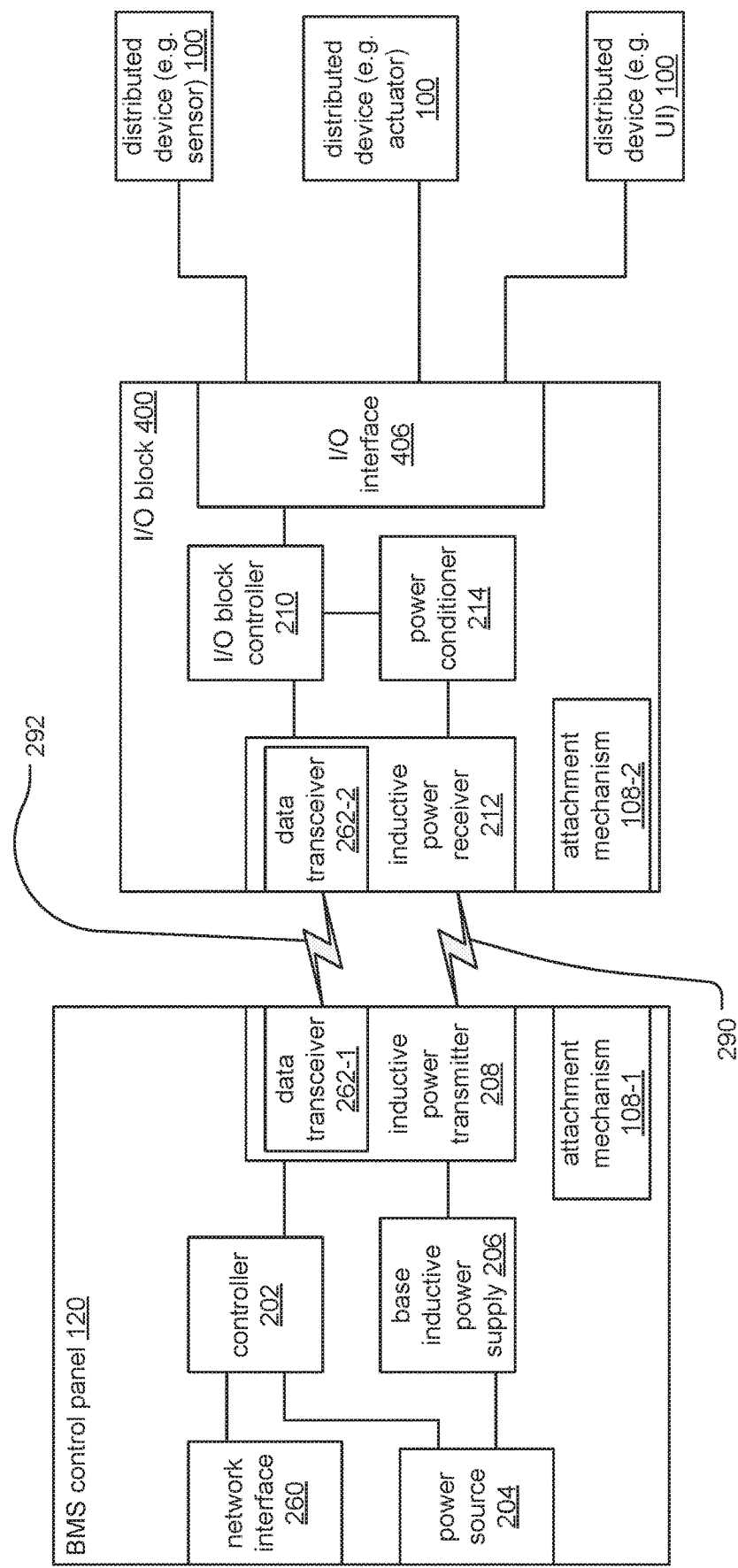
FIG. 4 is a schematic diagram of the building management system according to another embodiment of the present invention.

FIG. 4 is a schematic diagram of the building management system 10 according to another embodiment of the present invention.

As before, the building management system 10 includes a control panel 120 and distributed devices 100. Now, however, the building management system 10 includes an input-output block 400, which provides an interface for the distributed devices 100 to communicate with the control panel 120.

The control panel 120 includes a controller 202, a network interface 260, a power source 204, a base inductive power supply 206, an inductive power transmitter 208 with a data transceiver 262-1, and an attachment mechanism 108-1.

Similarly, the input-output block 400 includes a controller 210, a power conditioner 214, an inductive power receiver 212 with a data transceiver 262-2, and an attachment mechanism 108-2.

Additionally, the input-output block 400 includes an input-output interface 406, which allows connectivity between the input-output block 400 and the distributed devices 100 (e.g. via analog and/or digital inputs and outputs).

As before, the control panel 120 inductively powers the input-output block 400 via the wireless power link 290. The input-output block 400 in turn relays signals and/or data between the control panel 120 and the distributed devices 100 via the wireless communications link 292 and the input-output interface 406.

In other embodiments (not illustrated), the control panel 120 can accommodate multiple input-output blocks 400, allowing additional input-output blocks 400 to be added to the control panel 120 as the building management system 10 to expands.

Figure 5:
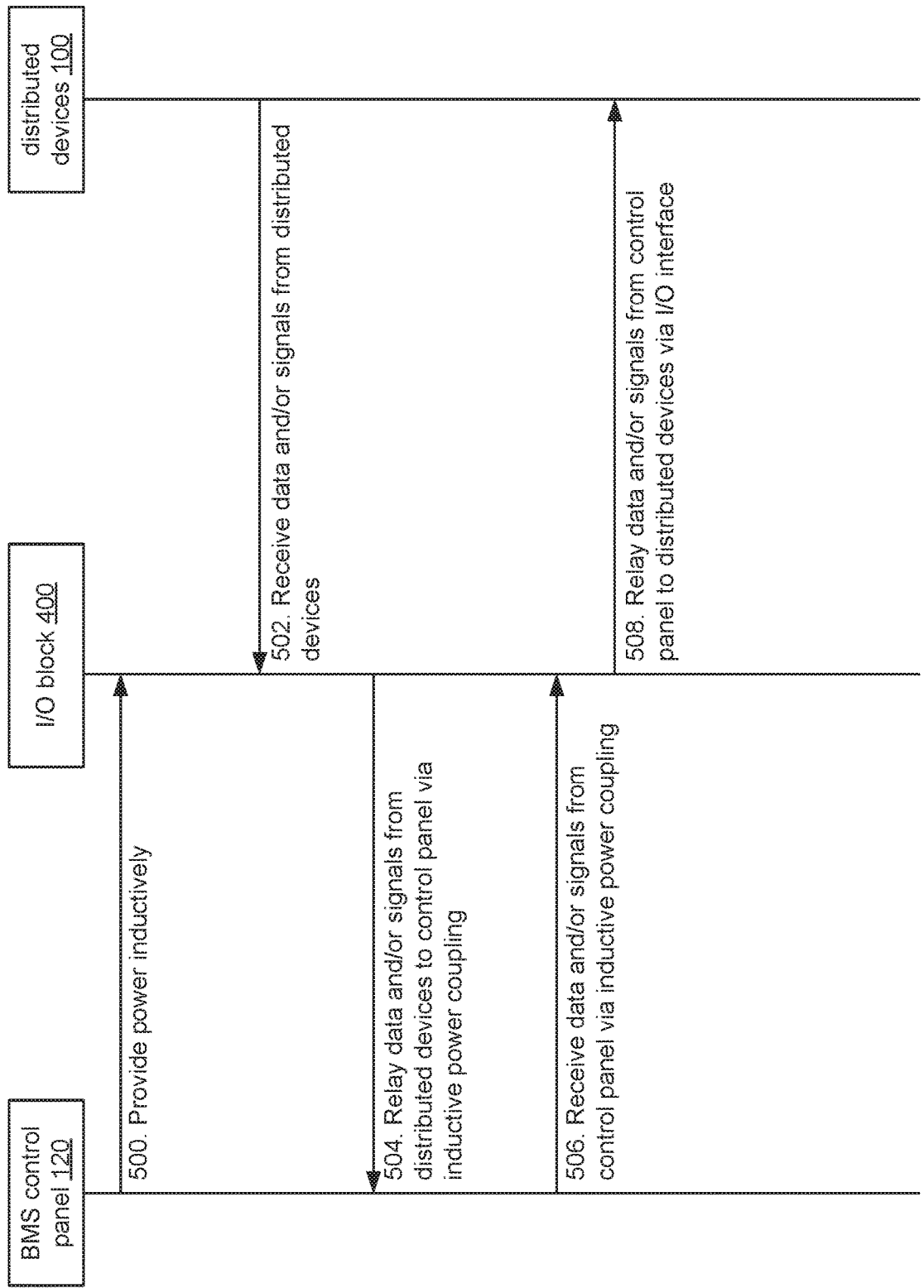
FIG. 5 is a sequence diagram illustrating the process by which the distributed devices and control panel communicate via an input-output block.

FIG. 5 is a sequence diagram illustrating the process by which the distributed devices 100 and control panel 120 communicate via the input-output block 400, which is inductively coupled with the control panel 120.

In step 500, the control panel 120 provides power to the input-output block 400 inductively, via the wireless power link 290.

In step 502, the input-output block 400 receives data and/or analog signals from the distributed devices 100 via the input-output interface 406, which are then relayed to the control panel via the wireless communications link 292 in step 504.

In step 506, the input-output block 400 receives data and/or analog signals from the control panel 120 via the wireless communications link 292 and relays the data and/or signals to the distributed devices 100 via the input-output interface 406 in step 508.

In one example, an input-output block 400 provides an interface between a programmable logic controller (PLC) operating as a control panel 120 for a building automation system and an array of distributed devices 100 containing light sensors 220-2. The light sensors 220-2 monitor the lighting levels throughout the building and generate and send analog signals and/or sensor data to the input-output block 400 via the input-output interface 406. The input-output block 400 relays the signals and/or sensor data to the PLC via the data transceivers 262. The PLC adjusts the lighting conditions of the building based on the signals and/or sensor data and predetermined settings, for example, by sending instructions to actuators 220-3 such as lighting systems of the building automation system to brighten or dim as appropriate.

In another example, an input-output block 400 provides an interface between a fire alarm panel operating as a control panel 120 for a fire alarm system and an array of distributed devices 100 containing sensors 220-2 such as smoke detectors. The sensors 220-2 monitor the conditions of the building for smoke and generate and send analog signals and/or sensor data to the input-output block 400 via the input-output interface 406. The input-output block 400 relays the signals and/or sensor data to the fire alarm panel via the data transceivers 262. Based on the signals and/or sensor data, the fire alarm panel initiates an alarm condition, for example, by sending instructions to sounders of the fire alarm system to alert occupants of the building of a potential fire.

In yet another example, an input-output block 400 provides an interface between a security panel operating as a control panel 120 for a security system and an array of distributed devices 100 containing sensors 220-2 such as motion detectors. The sensors 220-2 monitor the conditions of the building for movement and generate and send analog signals and/or sensor data to the input-output block 400 via the input-output interface 406. The input-output block 400 relays the signals and/or sensor data to the security panel via the data transceivers 262. Based on the signals and/or sensor data, the security panel initiates an alarm condition, for example, by sending an alert to security personnel.

In still another example, a first input-output block 400 provides an interface between an access control system controller operating as a control panel 120 for an access control system and an array of distributed devices 100 containing actuators 220-3 such as door locks. A second input-output block 400 provides an interface between the access control system controller and user interface elements 220-1 such as numerical keypads associated with restricted access points. The user interface elements 220-1 receive user inputs representing access codes for the different access points of the building and generate and send validation information to the second input-output block 400 via that block's input-output interface 406. The input-output block 400 relays the validation information to the access control system controller via the data transceivers 262. Based on the validation information, the access control system controller unlocks access points throughout the building, for example, by sending instructions to the first input-output block 400 via the data transceivers 262. The input-output block 400 relays the instructions to the door locks, which unlock in response.

In all of these examples, the control panel 120 may include multiple inductive power transmitters 208, and additional input-output blocks 400 may be added to the control panels 120, for example, by attaching them via the attachment mechanism 108 to different slots or sockets over time as the building management system expands and further distributed devices 100 are installed.

While this invention has been particularly shown and described with references to preferred embodiments thereof, it will be understood by those skilled in the art that various changes in form and details may be made therein without departing from the scope of the invention encompassed by the appended claims.

What is claimed is:

1. A distributed device of a building management system, the device comprising:
   a base module comprising an inductive power transmitter;
   a secondary module attached to the base module, the secondary module comprising an inductive power receiver for receiving power from the inductive power transmitter of the base module and the secondary module further comprising one or more sensors, user interface elements, and/or actuators of the building management system; and
   one or more attachment mechanisms for securing the secondary module to the base module,
   wherein the base module is permanently mounted to a mounting surface of a building where the building management system is installed and is connected to a mains power line, which supplies alternating current electric power to the base module at voltages ranging from 110 to 240 Volts,
   wherein the secondary module is configured to receive identification information from the base module and transmit the identification information to a control panel of the building management system for updating operating parameters of the distributed device,
   wherein the second module communicates with the control panel of the building management system via a wireless transceiver, either directly or via a hub, and
   wherein the control panel of the building management system is permanently installed in a building and the control panel is located separately from the base module and the secondary module.

2. The device as claimed in claim 1, wherein the one or more sensors, user interface elements, and/or actuators generate signals and/or sensor data to be sent to the control panel of the building management system.

3. The device as claimed in claim 1, wherein the one or more sensors, user interface elements, and/or actuators detect user input data and provide status information to users and/or technicians of the building management system.

4. The device as claimed in claim 1, wherein the one or more sensors, user interface elements, and/or actuators control equipment of the building management system.

5. The device as claimed in claim 1, wherein the base module confirms compatibility with the secondary module before providing power to the secondary module.

6. The distributed device of claim 1, wherein the building management system is a building automation system, and the secondary module functions as a thermostat of the building automation system.

7. The distributed device of claim 1, wherein the building management system is a fire alarm system, and the secondary module functions as a smoke detector of the fire alarm system.

8. The distributed device of claim 1, wherein the building management system is a security system, and the secondary module functions as a motion sensor for the security system.

9. The distributed device of claim 1, wherein the building management system is an access control system, and the secondary module functions as an access control reader of the access control system.

10. The distributed device of claim 1, wherein an old secondary module can be detached from the base module and replaced with a new secondary module.

11. The distributed device of claim 1, wherein the base module does not attempt to provide power if a metal object that is not a recognized secondary module is placed in proximity to the inductive power transmitter.

12. The distributed device of claim 1, wherein the secondary module receives data and instructions from the control panel of the building management system via the wireless transceiver, either directly or via the hub.

13. A method for operation of a distributed device of a building management system, the method comprising:
   a base module providing power via an inductive power transmitter to a secondary module attached to the base module;
   the secondary module receiving the power from the base module via an inductive power receiver, receiving identification information from the base module, and transmitting the identification information to a control panel of the building management system for updating operating parameters of the distributed device; and
   one or more sensors, user interface elements, and/or actuators of the secondary module communicating with the control panel of the building management system via a wireless transceiver, either directly or via a hub,
   wherein one or more attachment mechanisms secure the secondary module to the base module, and the base module is permanently mounted to a mounting surface of a building where the building management system is installed and is connected to a mains power line, which supplies alternating current electric power to the base module at voltages ranging from 110 to 240 Volts, and
   wherein the control panel of the building management system is permanently installed in a building and the control panel is located separately from the base module and the secondary module.

14. The method as claimed in claim 13, further comprising the one or more sensors, user interface elements, and/or actuators generating signals and/or sensor data to be sent to the control panel of the building management system.

15. The method as claimed in claim 13, further comprising the one or more sensors, user interface elements, and/or actuators detecting user input data and providing status information to users and/or technicians of the building management system.

16. The method as claimed in claim 13, further comprising the one or more sensors, user interface elements, and/or actuators controlling equipment of the building management system based on signals and/or data received from the control panel of the building management system.

17. The method as claimed in claim 13, wherein the base module is compatible with different interchangeable secondary modules.

18. The method as claimed in claim 13, further comprising the base module confirming compatibility with the secondary module before providing power to the secondary module.

19. The method as claimed in claim 13, wherein the secondary module receives data and instructions from the control panel of the building management system via the wireless transceiver, either directly or via the hub.

* * * * *